Patented Apr. 13, 1954

2,674,763

UNITED STATES PATENT OFFICE 2,674,763

MANUFACTURE OF HARD CARBON PRODUCTS FROM PITCH

Charles Desmond Greaves and William Duncan Parker, London, England, assignors to C. D. Patents Limited, London, England, a British company No Drawing. Application September 12, 1950, Serial No. 184,526

Claims priority, application Great Britain October 4, 1949

10 Claims. (Cl. 18—47.5)

This invention relates to the manufacture of hard carbon products from pitch and the object is to produce (from pitch) carbon or shaped carbon articles (e. g. moulded or extruded products) having a very high degree of hardness and of resistance to abrasion as well as resistance to high temperatures and to the action of acids, alkalis and other corrosive chemicals.

It has already been proposed in British patent specification No. 619,967 to produce useful moulded products by a process which consists in intimately admixing at an elevated temperature pitch or tar which has been dissolved or dispersed in an organic solvent (e. g. solvent naphtha or a hydrogenated aromatic hydrocarbon) with concentrated sulphuric acid, washing, drying and moulding to the required shape the polymerised or condensed pitch or tar so produced (which is of an agglutinating character), and submitting the moulded shape to a heat treatment (e. g. to firing at a rate of temperature rise of about 1° C. per minute up to 800° C.

According to the invention there is provided a process of making hard carbon moulded products which process is characterised in that it comprises dissolving or dispersing pitch in a hydrocarbon solvent (such as solvent naphtha) with vigorous agitation, adding, while agitation continues, an amount of sulphuric acid in sufficient excess of the amount necessary to secure an agglutinating precipitate to ensure that the precipitate possesses little or no agglutinating properties, washing the precipitate free of excess sulphuric acid and subjecting it to a digestion treatment with one or more softening or plasticising agents, which renders it extrusible into rods, tubes, bars and/or otherwise mouldable into these or other shapes, while simultaneously conferring on it or restoring to it the absent or lost agglutinating properties, and firing the extruded or otherwise moulded article, with or without previous drying, at or near to the maximum rate of temperature rise consistent with the avoidance of intumescence and under non-oxidising conditions to a temperature of at least 1000° C. The temperature of firing is preferably up to 1400° C.

It is desirable to use a hard pitch which is crushed and dispersed in a suitable solvent such as a solvent naphtha boiling between 140° C. and 160° C. The solution is heated to boiling point, while being stirred vigorously, and strong sulphuric acid (e. g. 98% $H_2SO_4$) is slowly added. A vigorous reaction occurs with the evolution of oxides of sulphur and other compounds and after a certain amount say between 15% and 35% by weight of acid has been added, a hard granular precipitate is formed. Heating is continued for about 10 minutes after completion of acid addition and then the precipitate is drained and washed thoroughly to remove as much acid as possible. The precipitate is then dried to remove water and organic solvent, care being taken to avoid atmospheric oxidation. The hard black residue is now comminuted to a fine particle size, say —200 mesh, a very fine degree of comminution being unnecessary. It has been found necessary in order to get the best ultimate product so to conduct the sulphuric acid treatment particularly with respect to the amount used, that this dried and comminuted powder is non-agglutinating. The greater the amount of acid, the higher the temperature of reaction, and the longer the reaction time, the less will be the agglutinative property of the precipitate. By "non-agglutinating" is meant having a zero or negligible swelling number. The test of "swelling number" is carried out as described in the British Standard Publication No. 1016 of 1942. The hard pitch used preferably but not necessarily has a softening point above 150° C.

The powder is then mixed at an elevated temperature with a softening or plasticising agent as hereinafter defined. The expression "softening or plasticising agents" used herein means one or more of the following: Coal tar middle oil, coal tar heavy oil, coal tar anthracene oil, coal tar pitch (including specially treated pitches which are neutral), aromatic compounds, mixtures of aromatic hydrocarbons, naphthenic hydrocarbons, heterocyclic compounds of nitrogen containing only one nitrogen atom in the nucleus, petroleum residues, soft bitumen and asphalt. The amount of these agents added is adjusted to give the requisite plasticity for the moulding process and a suitable degree of agglutination to yield a hard, strong product on carbonisation. The shaping process may be carried out by normal techniques such as pressure moulding or injection moulding or extrusion, which are preferably carried out above room temperature, e. g. at 50° to 100° C. It may be desirable to dry the moulded articles by placing them in an oven raising the temperature of the latter to about 60° to 100° C. and maintaining this temperature for a time dependent on the size and shape of the articles but which is usually about 24 hours. This drying process is often found to improve the quality of the product and to simplify the firing schedule as it removes volatile components whose expulsion during carbonisation would tend to cause swelling or the appearance of cracks and flaws.

The firing of the moulded articles may be carried out by embedding them in ground coke in a box made of suitable material such as steel sheet and fitted with a lid, and placing the box inside a furnace with means for controlling the rate of temperature rise. A non-oxidising atmosphere must be maintained within the furnace which is heated at or near the maximum rate consistent with the avoidance of intumescence to a temperature in excess of 1000° C. and preferably up to 1400° C. The expression "at or near the maximum rate consistent with the avoidance of intumescence" must not be taken to imply that there is an absolute maximum which is independent of particular local conditions. The operator should experimentally determine beforehand what is the maximum rate, for the particular conditions of process and material used, which can be tolerated without causing intumescence in the temperature range 0–550° C.

Extremely hard, strong carbon articles are thus produced. These generally have a metallic "ring" and are appreciably harder than carbons produced by known methods. Carbon articles having a hardness on the Moh scale of 8–8½ which will readily scratch glass or silica and can be used as a glass cutting tool, giving extremely clean fractures, can be produced by the process of the invention. These hard carbon articles may be used where resistance to abrasion is required as, for example, in bearings, in extrusion nozzles and in conduits for liquid suspensions of finely divided solids or for like freely-flowing materials having an abrasive action.

*Example*

200 gm. of a solvent naphtha boiling between 140 and 160° C. were placed in a 1 litre Pyrex flask fitted with a cork bung, a high speed paddle stirrer, a reflux water condenser, a thermometer and a dropping funnel, and heated to boiling point. 150 gm. of a hard pitch (softening point 178° C.) crushed to about −¼″ were added and vigorous stirring carried on throughout. The temperature was maintained at boiling point until all the pitch was dispersed and 25 ml. of 98% sulphuric acid were slowly run into the liquid from the dropping funnel. A vigorous reaction occurred and large quantities of sulphur dioxide and other compounds were released. Addition of the acid took about 10 minutes and the temperature was maintained at boiling point for a further 5 minutes, care being taken to avoid overflow of froth. Heating and stirring were then discontinued and after decanting the liquid, the granular precipitate was removed from the flask, crushed with a pestle and mortar to facilitate washing and washed with distilled water until negligible quantities of sulphuric acid were detected in the washings. The precipitate was then filtered off, placed in a covered vessel and dried for 2 hours in an oven at 200° C. An 80% yield on the original pitch was obtained in this manner. The precipitate was then ground with a hammer mill to give a powder 95% of which passed through a 200 mesh sieve.

200 gm. of powder prepared in the above manner were then mixed in a dough mixer (Z-blade mixer) with 100 gm. of anthracene oil for 2 hours at 120 to 140° C. 70 gm. of heavy naphtha were added and mixing continued for another hour at 70 to 80° C. The resultant dough was placed in the cylinder of an extrusion press heated to 80 to 85° C., and the material was extruded through a ½″ circular nozzle. The resultant cylindrical rods were placed in an air oven which was heated to 80° C. over an hour and maintained at that temperature for 24 hours. They were then embedded in ground coke in a steel box fitted with a lid which was placed in an electric muffle furnace in which nitrogen was introduced so as to maintain a non-oxidising atmosphere throughout the firing operation. Firing was carried out at a rate of temperature rise of 60° C. per hour up to 850° C., and further fired to a temperature of 1400° C., at an uncontrolled rate of temperature rise.

On cooling, the products were found to be strong, and of the exceptional hardness described above.

What we claim is:

1. A process of making extremely hard carbon products, which process comprises treating hard pitch with more than its own weight of solvent naphtha with vigorous agitation, adding, while agitation continues, 98% sulphuric acid in an amount of the order of 33% by weight of the pitch, washing the resulting precipitate free of excess sulphuric acid and subjecting it to a digestion treatment with at least one plasticizing agent and thereafter forming the plasticized material into the required shape and firing it with gradually increasing temperature to a temperature of at least 1000° C.

2. In a process of making carbon products by producing a carbonaceous moulding powder, mixing the moulding powder with a plasticizing agent, forming the plasticized mix into the required shape and firing the shape with gradual upheat to a temperature of at least 1000° C., a method of producing the carbonaceous moulding powder, which method comprises treating with vigorous agitation hard pitch with about 133% of its weight of a solvent naphtha boiling between 140° and 160° C., adding, while agitation continues, 98% sulphuric acid in an amount about 33% by weight of the pitch and washing the resultant precipitate free of excess sulphuric acid.

3. In a process of making carbon products by producing a carbonaceous moulding powder, mixing the moulding powder with a plasticizing agent, forming the plasticized mix into the required shape and firing the shape with gradual upheat to a temperature of at least 1000° C., a method of producing the carbonaceous moulding powder, which method comprises treating with vigorous agitation pitch with solvent naphtha, adding, while agitation continues, an amount of sulphuric acid in excess of the amount necessary to secure an agglutinating precipitate so that the precipitate possesses negligible agglutinating properties and washing the precipitate free from excess sulphuric acid.

4. In a process of making carbon products by producing a carbonaceous moulding powder, mixing the moulding powder with a plasticizing agent, forming the plasticized mix into the required shape and firing the shape with gradual upheat to a temperature of at least 1000° C., a method of making the carbonaceous moulding powder which method comprises heating to a boiling point a solvent naphtha boiling between 140° and 160° C., adding with vigorous agitation a crushed hard pitch of softening point about 178° C., in an amount about 75% by weight of the solvent naphtha, slowly adding 98% sulphuric acid in an amount about 33% of the pitch, continuing the heating at boiling point for about 5 minutes and separating and washing the resulting precipitate substantially free of sulphuric acid, thereafter drying and comminuting the precipitate.

5. The process of making extremely hard carbon shaped products which process comprises treating pitch with a hydrocarbon solvent with vigorous agitation, adding, while agitation continues, an amount of sulphuric acid in excess of the amount necessary to secure an agglutinating precipitate so that the precipitate possesses negligible agglutinating properties, washing the precipitate free of excess sulphuric acid and subjecting it to a digestion treatment with at least one plasticizing agent, shaping the softened material by known methods and firing the shaped articles under non-oxidizing conditions and at as high a rate of temperature rise as is consistent with the avoidance of intumescence to a temperature of at least 1,000° C.

6. A process as claimed in claim 5 wherein the pitch used as a starting material has a softening point above 150° C. and wherein the pitch is crushed and dispersed in boiling naphtha whereupon strong sulphuric acid is slowly added with vigorous agitation in a proportion by weight of 15 per cent to 35 per cent.

7. A process as claimed in claim 5 wherein the precipitate after washing is dried and comminuted and mixed to form a paste with a plasticizing agent selected from the group consisting of coal tar mineral oil, coal tar heavy oil and coal tar anthracene oil.

8. A process as claimed in claim 5 wherein the precipitate after washing is dried and comminuted and mixed to form a paste with a plasticizing agent selected from the group consisting of coal tar pitch, petroleum residues, soft bitumen and asphalt.

9. A process as claimed in claim 5 wherein the precipitate after washing is dried, comminuted and mixed to form a paste with a plasticizing agent comprising at least one aromatic hydrocarbon.

10. A process as claimed in claim 5 wherein the precipitate after washing is dried, comminuted and mixed to form a paste with a plasticizing agent selected from the group consisting of heterocyclic compounds of nitrogen containing only one nitrogen atom in the nucleus.

References Cited in the file of this patent

UNITED STATES PATENTS

| Number | Name | Date |
|---|---|---|
| 1,839,181 | Fischer | Dec. 29, 1931 |
| 2,204,533 | Fischer | June 11, 1940 |
| 2,299,469 | D'Antal | Oct. 20, 1942 |
| 2,563,285 | Shea et al. | Aug. 7, 1951 |
| 2,582,764 | Bailey | Jan. 15, 1952 |

FOREIGN PATENTS

| Number | Country | Date |
|---|---|---|
| 11,687 | Great Britain | of 1899 |
| 52,704 | Germany | July 8, 1890 |
| 278,679 | Great Britain | Apr. 5, 1928 |
| 429,548 | Great Britain | May 31, 1935 |
| 626,973 | Germany | Mar. 7, 1936 |
| 663,805 | Germany | Sept. 9, 1938 |